Figure 1:
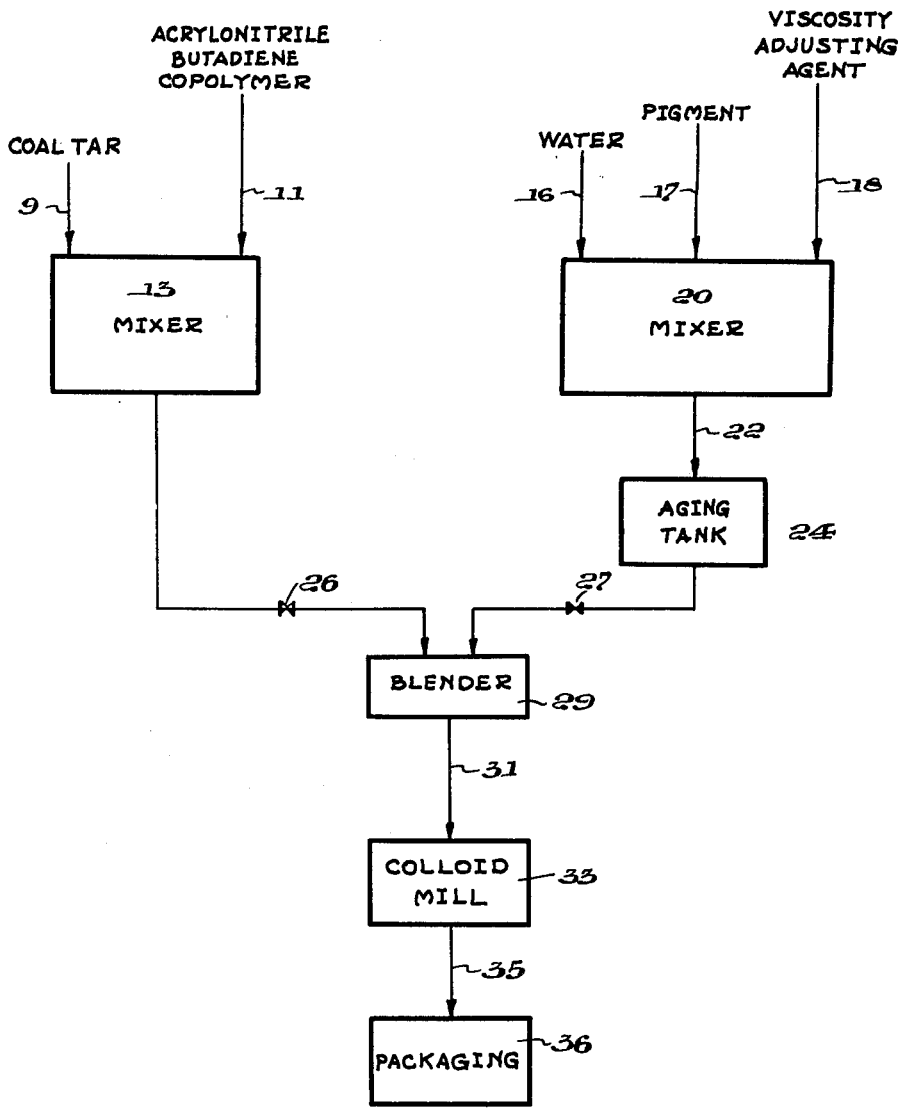

INVENTORS
WOODROW E. KEMP
JOHN J. LANE
BY Oscar B. Brumback.
their ATTORNEY

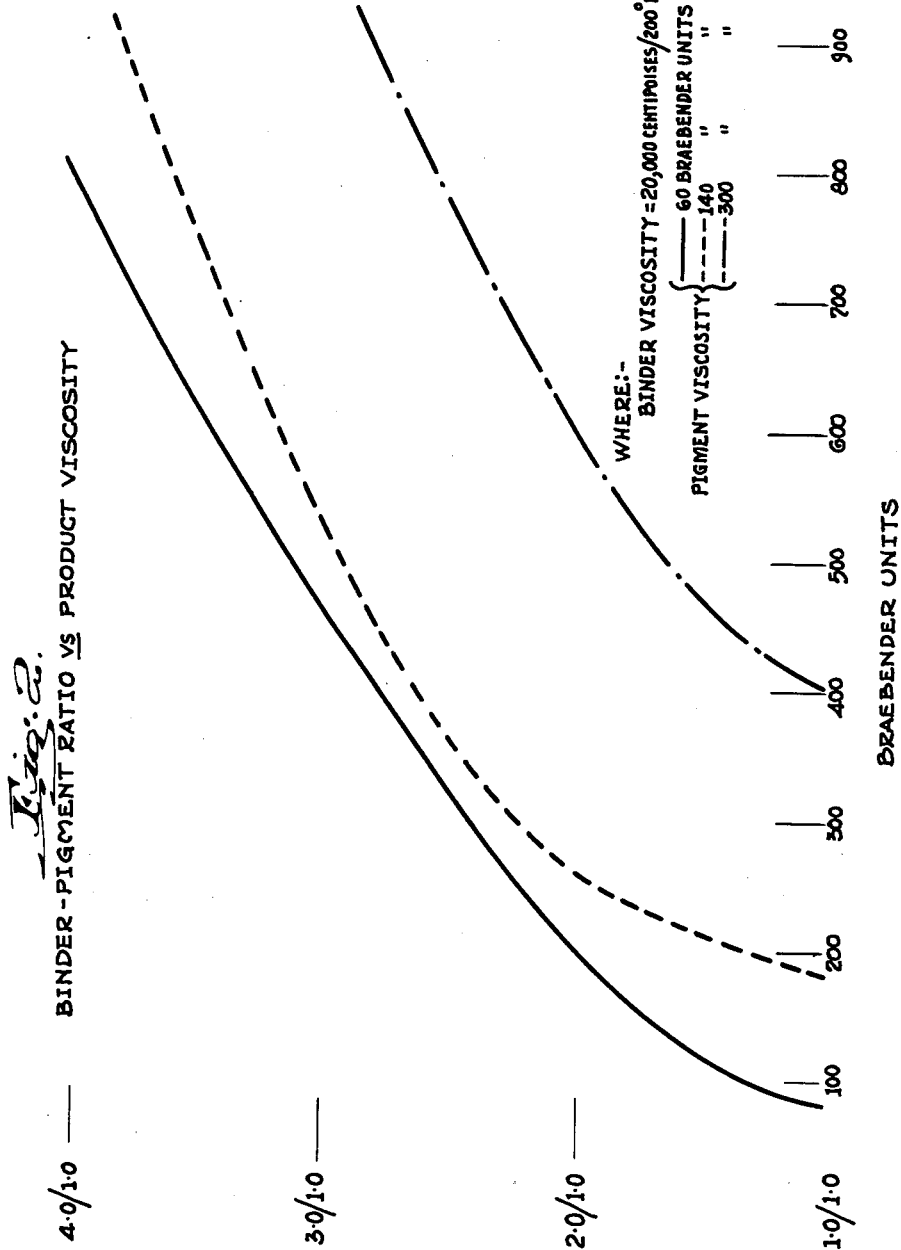

3,027,342
COAL TAR EMULSIONS CONTAINING SYNTHETIC RESIN AND FILLER

Woodrow E. Kemp, Pittsburgh, and John J. Lane, Murrysville, Pa., assignors to Koppers Company, Inc., a corporation of Delaware
Filed Apr. 17, 1959, Ser. No. 807,101
7 Claims. (Cl. 260—28.5)

This invention relates to aqueous tar emulsions of general application.

A conventional practice in the protective coating art is to brush, spray, or paint the articles with an aqueous emulsion of coal tar. Since coal tar by itself does not readily form an emulsion in an aqueous medium it has been necessary to use a dispersing agent, such as an organic soap or detergent, or an inorganic colloid such as bentonite to form an emulsion. To reduce the size of the tar particles in the discontinuous phase, it is customary to pass the materials through a colloid mill, this providing an emulsion having tar particles whose average size ranges from 3–10 microns.

When a coating of coal tar dries on the article it provides a protective film for the article. Such a film has certain disadvantages however. For example, it is readily attacked by various solvents, such as jet fuel; it is soft; and its ductility or tensile strength is not all that could be desired under various atmospheric conditions. To improve these properties it has been proposed to include various pigments with the emulsion but this has been difficult heretofore because the emulsions as known heretofore have required careful control of the pH value and because of the tendency of pigments to coagulate the emulsion. It has been found that the solvent resistance and the elasticity of the film was improved when a latex of a copolymer of acrylonitrile and butadiene was added to the coal tar emulsion. The disadvantage however was that as the composition was an emulsion having two different types of particles and, as the composition dried, the particles of latex joined with the particles of tar to provide a loose junction that was readily broken down under weather, temperature, light, and other chemical and physical attacking agents. Also since the emulsion was formed with an emulsifying agent, such as bentonite, the resulting protective coating had a tendency to re-emulsify when it was subjected to a detergent and water.

It has now been found in accordance with this invention that a solution formed by dissolving a copolymer of acrylonitrile and butadiene in coal tar can be successfully emulsified in an aqueous medium without the addition of an emulsifying agent. While the mechanism by which this emulsion forms is not entirely known, the emulsion apparently forms because the solution of the copolymer in the coal tar has characteristics different from that of the coal tar alone; one of these characteristics being this ability to form a stable emulsion. When coal tar or other bituminous material is mixed with water and mineral pigments (slurry) with a dispersing agent such as bentonite, as in a colloid mill, the bituminous material is subdivided through the water and the emulsion is formed immediately with the water as the exterior phase. On the other hand, the mechanism of the emulsion formation of this invention wherein the bituminous material is a solution of a copolymer of acrylonitrile and butadiene in coal tar is quite different. The aqueous medium, water or slurry, is dispersed throughout the plastic mass when the aqueous medium and the solution are first admixed so that no free water can be observed and the whole mass increases a thousand fold in viscosity and partakes the natures of a soft rubber ball. When high shear forces are then applied to this mass the solution of copolymer in tar is sheared into small particles (which appear to pick up an electrical charge from the power input, become spherical, and repel each other) and the water becomes the exterior phase. If mineral pigments be present in the aqueous medium as a suspension or slurry, the solution of copolymer in tar, as the exterior phase, coats each particle and the mineral pigments are thereafter present only as specific reinforcement agents for the solution of copolymer in tar and not as colloidal dispersants, if the pigments previously had such powers. The unusual mechanism of emulsification of the emulsion of this invention is unique and apparently as a result of the unusual properties of the solution of the copolymer acrylonitrile and butadiene in coal tar. The result is that the emulsion of this invention produces a non-porous film that is as resistant to ambient environment as formerly could be produced by deposition of the film from a solvent.

In accordance with this invention the properties of the finished film can thus be varied by the choice of pigment added to the aqueous medium without regard to the characteristics of the aqueous medium.

Heretofore it has been necessary to carefully control the acid value of the aqueous medium and to restrict the pigments to those compatible with the dispersing agent. In accordance with this invention, pigments may be added to reinforce the film without regard to their colloidal nature. With the wide choice of pigments possible with this invention, the composition of the emulsion can be varied so as, for example, to use clay to impart hardness to the film, to use silica flour or shale dust to provide resistance to acid atmosphere, to use carbon black to resist hydrofluoric acid, and to use inhibitors such as lead oxide if the film is to be used for the protection of metals.

In accordance with this invention a protective coating having improved flexibility, toughness, chemical resistance, stability, storage life, and adherence is provided by a composition comprising a solution of a copolymer of acrylonitrile and butadiene in coal tar, which solution is emulsified in an aqueous medium containing a pigment and, if desired, a viscosity control agent.

The copolymer of acrylonitrile and butadiene is comprised of a major portion, 51–80 parts by weight of butadiene 1,3, and a minor portion, correspondingly 49–20 parts by weight of acrylonitrile, and is a commercially available material having a Government synthetic rubber designation of GR–A. The higher the acrylonitrile content the harder it is to dissolve the copolymer in the tar, and the lower the acrylonitrile content the less resistance the film has to solvents such as jet fuel. To facilitate the solution in the coal tar and reduce the mixer schedule time the copolymer may be broken down on a rubber mill. A convenient product for use in this invention is a butadiene acrylonitrile synthetic rubber sold under the trade name Hycar and having a Mooney viscosity of from 45–100. The Hycar Type 1442 is sold in crumb form and readily goes into solution. The copolymer additionally gives the film elasticity, ductility, and reduced susceptibility to temperature changes. It has been found that if the amount of copolymer be less than 1% by weight of the tar the desired physical properties are not present in the final product and if the amount of copolymer is greater than 5%, the final product has greater temperature susceptibility, less toughness, and poorer weathering qualities. Greater than 5% of the copolymer also gives a dispersion of the copolymer in the tar rather than a solution in the tar as is desired.

The coal tar in which the copolymer is dissolved may be a coal tar of the type conventionally designated as RT–6 to RT–12. Such tars have an overall float test ranging from twenty seconds to two hundred and twenty seconds. The float test 139–27 ASTM standard 1942 T 480 is commonly used for testing the viscosity of semisolid bituminous material.

The copolymer is readily dissolved in the tar by maintaining the tar under agitation at an elevated temperature while the copolymer is added to the tar. The copolymer does not dissolve well if the temperature of the tar is below 230° F. but if the temperature be greater than 315° F., the breakdown temperature of the copolymer is approached and the copolymer begins to decompose. The resulting solution can be stored either hot or cold for an indefinite period after the solution of the copolymer in tar without separation or sludging. The change in viscosity of a typical tar type RT–12 before and after the addition of three percent of the copolymer Hycar 1442 is shown in the following table. (Viscosity being measured with a Brookfield viscosimeter Model LVF operated at 6 r.p.m.)

| Temperature | Spindle | Viscosity | |
|---|---|---|---|
| | | RT–12 | Tar-Copolymer |
| 200° F | 4 | 275 | 9,500 |
| 225° F | 4 | 100 | 4,000 |
| 250° F | 2 | 50 | 1,200 |

The aqueous slurry in which the tar-copolymer solution is emulsified desirably includes a pigment which may be any of the common pigments, such as ball clay, china clay, soap stone, ground lime stone, carbon black, fly ash, and barytes. A feature of this invention is that the pigment, depending upon the use to which the composition is to be put, may be varied widely. Thus, if the composition is to be dried to a resulting film which is to be exposed to an ambient atmosphere of acidic nature, the pigment may be slate flour, mica, or powdered tile. If the material is to be applied to steel, for example, it may be that the pigment will be an inhibiting oxide or carbonate, such as lead oxide, calcium plumbate, lead chromate, zinc oxide, or strontium salt. The content of pigment of the slurry may range from twelve to forty-five percent by weight of the aqueous medium, but advantageously is within the range of from fifteen to thirty percent by weight. Below twelve percent of pigment in the slurry, the final product is adversely affected by the weather because there will be an excess of tar-copolymer in the film and the film may become brittle, and the film may melt at higher temperatures. Above forty-five percent there is too much pigment for the amount of solution available and the film may loose some of its elasticity. Thus, these wide ranges of kinds and percentages of pigments enable the characteristics of the chemical and physical resistance of the film to be widely varied.

Another feature of this invention is that the characteristics of the film can be readily controlled by the tar-copolymer solution to pigment ratio. Thus, once the end use of the composition is determined the copolymer-pigment ratio can be adjusted accordingly. Since the two components of the emulsion are made up separately, it is simple to combine the two components to achieve the desired binder-pigment ratio. Then, the method of application is determined, that is whether the material is to be trowled, brushed, painted, or sprayed. For dipping and flood coating the product viscosity should be between 60–100 Brabender Units, for brushing or spraying 200–450 units, for trowling 400–1000. The viscosity of the emulsion is advantageously controlled by regulating the viscosity of the slurry prior to the production of the emulsion.

It will be recognized that each of the pigments gives a viscosity in slurry suspension that is characteristic of its own. Typical pigments and viscosities are shown below.

| Pigment: | Viscosity |
|---|---|
| China clay | 300–1000 |
| Ball | |
| Slate flour | 100–300 |
| Mica | |
| Talc | |
| Silica flour | 50–100 |
| Inhibitive oxides and carbonates | |

Where the viscosity is a factor the viscosity of the slurry may be adjusted by the use of viscosity adjusting agents. Deflocculating agents which decrease the viscosity include diammonium phosphate, sodium lignin, sulfonate, phenol, tetra and pyro sodium phosphate, polyvinyl acetate, sodium silicate, sodium metasilicate, morphalene, and sodium naphthanate. It may also be that the viscosity is not great enough in which event suitable coagulating or thickening agents may be added such as acetic acid, sodium sulphate, magnesium oxide, and various organic gums and polymers such as polyvinyl alcohol. In general, a deflocculating agent will decrease the pigment slurry viscosities by 500 Brabender Units for each addition of one-tenth percent by weight of slurry, while the thickening agents will increase the viscosity by 500 Brabender Units with each 0.05% added. Such viscosity adjustments are common practice for those skilled in the art and may be varied from the foregoing figures, depending upon the characteristics of the raw material from different sources.

In accordance with this invention the tar solution at a temperature between 275° F. and 315° F. and the aqueous slurry at a temperature between 100° F–135° F. are fed to a blender which subjects the mixture to something of a shearing action, the resulting product, a thick, doughy mass, from the blender is fed through a colloid mill or other devices which tend to shear the particles which pass in between small clearances. The resultant material leaves the mill at a temperature of between 140–180° F. The product that comes from the colloid mill is dark brown in color, has a smooth creamy uniform appearance, and is fairly thick. This emulsion is still in the formation stage and thins upon cooling and upon standing takes on the nature of a gel. However, this gel is thixotropic and quickly breaks down upon mixing. The emulsion may be packaged as it leaves the colloid mill.

The composition of this invention when applied to a surface forms a flat, smooth continuous film reinforced with the pigment. The film is particularly resistant to the action of solvents such as jet fuel and moisture. The film also adheres well to wood, steel, glass, ceramic materials, and the like. The dried film from the emulsion can not be redispersed nor will it melt and flow. When exposed to temperatures above 400° F. the film merely becomes harder and if the temperature becomes high enough it chars at the exterior surface. However, if the film be subjected to a flame from an exterior cause the film will burn and the burning stops upon removal of the flame.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

FIGURE 1 is a schematic flow diagram of the production of the novel composition of this invention, and FIGURE 2 is a chart illustrating the relationship of the tar solution—pigment ratio to the viscosity of the composition.

The process of this invention, as illustrated in FIGURE 1, may be readily carried out in conventional apparatus. The coal tar and copolymer of acrylonitrile-butadiene may be fed by way of lines 9 and 11 to a conventional heated mixing vessel 13 where, under the influence of agitation and heat, the copolymer dissolves in the coal tar to provide the coal tar solution. Water through line 16, pigments through line 17, and a viscosity adjusting agent through line 18 may be fed into a conventional mixing tank 20 equipped with an agitator to form the slurry. This slurry from mixing tank 20 then flows through line 22 to an aging tank 24 which is also equipped with a suitable agitator so that the pigment will not settle out in the tank. The solution of copolymer and coal tar from mixing tank 13 and the slurry from aging tank 24 are fed through suitable metering valves 26 and 27 to a blender 29. This blender may be conventionally a high speed turbine pump. The output of blender 29 is a heavy, doughy mass and is fed through line 31 to a conventional colloid mill 33. The output from colloid mill 33 is a thick brown fluid and is fed by way of line 35 to a suitable packaging unit 36. The solution may be directly packaged in pails and stored until ready for use.

The solution of the copolymer in the tar and the slurry are storage stable and may be kept in storage until production requirements necessitate their use. In fact, it has been found best to age the slurry for a period of five days or more before the emulsion is made so that any change that occurs in viscosity or in pigment as a result of the slurrying in water will have occurred and reached equilibrium before the emulsion is formed.

The separate formation of the tar solution and the aqueous slurry enables the ratios of the solution to the slurry to be controlled by the proportioning valves so as to provide a predetermined ratio of copolymer-tar solution to pigment in the resulting emulsion, which ratio may vary widely in accordance with the use to be made of the emulsion and which ratios may be developed for a single solution and a single slurry.

Advantageously the weight ratio of copolymer-tar solution to pigment in the emulsion may vary from 0.8:1 to 4.0:1, depending upon the properties desired in the dry coating. When the composition is used as a film to coat an article, a larger proportion of the solution tends to make the resulting coating more elastic and flexible but softer and less abrasion resistant, while less solution and more pigment tends to make the resulting coating harder, coating tougher, abrasion resistant, less flexible, and less elastic. Where the emulsion is intended to be used as a sealer for bituminous or concrete paving, the proportions of tar-rubber to clay should be held within close limits, the preferred range being a weight ratio of 1.1:1 to 2:1 of tar-rubber to clay. For a protective coating for steel or insulation the preferred range is 2:1–3.0/1. For adhesive purposes this ratio may be increased to 4.0/1. The final copolymer-tar solution to pigment ratio may be accomplished by varying the proportion of copolymer-tar solution to slurry fed to the blender as the copolymer-tar solution and the slurry composition remain constant.

The following examples, where parts are parts by weight, will further illustrate the invention.

*Example I*

A copolymer-tar solution is made by dissolving 3 parts of an acrylonitrile-butadiene copolymer (Hycar Type 1442) in 97 parts of coal tar of the type RT–12 (Tarmac T–12). A slurry is made by adding 26 parts of clay (Jackson Ball Clay) to 74 parts of water. Fed to a blender and then to a colloid mill are 37.8 parts of the solution and 62.2 parts of the slurry. The emulsion from the colloid mill has a solution-pigment ratio of 2.2:1 and a water content of 46%. The emulsion is dark brown in color and has a smooth, creamy, uniform appearance and is particularly adapted for use as a sealer for pavement. The emulsion, when applied to the pavement, as by a brush, will dry by evaporation of water at any temperature above freezing. At 77° F. the coating will be dry to a light touch in one hour and "set up" in eight hours. Drying will be accelerated at higher temperatures but this is not required to cause final "set." A second coat can be applied within two hours, however, twelve to twenty-four hours between coats is preferable. The emulsion dries leaving a black, tough, elastic, highly resistant coating.

The emulsion provides a film which when subjected to Government specification GSA–00355A for solvent resistance, shows no penetration by kerosene. The film likewise shows resistance to water when subjected to Government specification MIL 15203A. The film was also placed under a dropping funnel and aviation type gasoline dropped on the film at the rate of one drop per second for a period of two weeks without penetration or solution of the film by the gasoline. The film will stretch as much as 350% without breaking at 79° F. and will stretch 500% without breaking at 100° F.

*Example II*

The copolymer-tar solution and the slurry of Example I were fed to the blender and colloid mill in the proportions of 19 parts of solution to 81 parts of slurry. The resulting emulsion was particularly adapted for use as a pavement sealer and had a water content of 60% and a copolymer-tar solution to pigment ratio of 1.1:1.

*Example III*

The copolymer-tar solution and the slurry of Example I were fed to the blender and colloid mill in the proportions of 33 parts of solution to 67 parts of slurry. The resultant emulsion had a water content of 51.0% and a copolymer-tar solution to pigment ratio of 2.0:1. The emulsion is particularly adapted for the protection of steel.

*Example IV*

The copolymer-tar solution and the slurry of Example I were fed to the blender and colloid mill in the proportions of 36.6 parts of solution to 63.4 parts of slurry. The resultant emulsion had a water content of 48.1% and a copolymer-tar solution to pigment ratio of 2.4:1. The emulsion is particularly useful for the lining of chimneys. The emulsion is brushed on the interior of the chimney and protects the mortar and ceramic or metallic portions of the chimney from attack by acidic and corrosive gases which pass through the chimney. Although the chimney may be subjected to high temperatures, the external surface of the coating merely hardens, cokes, or chars, but remains in place and the remaining portion of the film resists the penetration of the corrosive gases.

*Example V*

The copolymer-tar solution and the slurry of Example I were fed to the blender and colloid mill in the proportions of 41 parts of solution to 59 parts of slurry. The resultant emulsion had a water content of 45% and a copolymer-tar solution to pigment ratio of 3:1. The consistency of this emulsion lends it particularly well for use as a mortar. When added insulation is desired the emulsion may have incorporated therein asbestos fibers to give a product having the desired working characteristics.

The foregoing examples have illustrated the manner by which a series of emulsions for different uses may be made from a single slurry and a single solution of a copolymer of acrylonitrile and butadiene in tar. It will be recognized, as has been illustrated before, that each pigment has its own characteristic viscosity when made into an aqueous slurry. FIGURE II illustrates the viscosity of emulsions having various copolymer-tar solution to pigment ratios produced by a common copolymer-tar solution but with slurries having different viscosities.

Typical formulations classified by the use for which the composition is to be employed are as follows:

| Use | Emulsion Viscosity | Slurry Viscosity | Tar Solution Pigment Ratio |
|---|---|---|---|
| Pavement sealer | 80–180 | 40–90 | 2.2:1–1.1:1 |
| Steel Protection | 200–350 | 80–200 | 2.0:1–2.5:1 |
| Plaster Bond | 150–250 | 70–180 | 2.4:1–2.8:1 |
| Adhesive | 500–800 | 200–400 | 3.0:1–4.0:1 |
| Encapsulating Composition | 60–100 | 20–50 | 2.9:1–3.0:1 |

While the pH value of the emulsion made in accordance with this invention has not been found to be critical, it is advantageous to maintain the pH value of the slurry and the solution of the copolymer in tar to within the range of 5–8. When the pH gets as low as 5, a tendency exists for the pigment to rise to the surface of the film so that a coating of uniform color is not produced. On the other hand, a pH value of greater than 8 tends to evolve gas when the coating is applied to aluminum, zinc, or magnesium surfaces, and the gas blisters form under the coating.

The foregoing has presented a novel composition which has general utility. Since the composition contains no volatile and inflammable organic solvents, it is safe to apply in areas where inflammable solvents would be hazardous. The viscosity of the composition can be readily and easily varied so that compositions can be applied by any of the well known methods and such changes in viscosity can be made without affecting the tar to pigment ratio. Since the emulsion depends upon the characteristics of the copolymer in tar and does not depend upon any particular pigments, the physical characteristics of the resulting film can have a wide range by varying the pigments used and the solution to pigment ratio. The dried film has lasting ductility or liveness, has the necessary flexibility to expand and contract with the heat, and cold, and to withstand alternate wetting and drying and weathering and climatic conditions, such as rain, snow, sunlight, heat, and cold without checking of allegatoring. Once the film dries it will not flow, does not re-emulsify, and will resist temperatures greater than 400° F. It adheres readily to metal, even galvanized metal, glass, concrete, masonry, brick and insulation. The film by itself does not support combustion, will not burn unless exposed to a flame from another source and the burning stops when the flame is removed from the film.

We claim:

1. An emulsion consisting essentially of a solution of from 1 to 5% by weight of a copolymer of acrylonitrile and butadiene in coal tar emulsified in an aqueous slurry containing a pigment to the extent of 12 to 45% by weight, said copolymer being formed of from 49 to 20 parts by weight of acrylonitrile and from 51 to 80 parts by weight of butadiene, the ratio of solution to pigment being within the range of from 0.8:1 to 4.0:1.

2. A process for forming an emulsion consisting essentially of the steps of forming a solution of from 1 to 5% by weight of a copolymer of acrylonitrile and butadiene in coal tar, said copolymer being formed of from 49 to 20 parts by weight of acrylonitrile and from 51 to 80 parts by weight of butadiene, forming an aqueous slurry containing from 12 to 45% by weight of a pigment, blending said solution and said slurry so that the ratio of solution to pigment is within the range of from 0.8:1 to 4.0:1, and subjecting said blend to intense shearing to form an emulsion of said solution in said aqueous medium.

3. An emulsion consisting essentially of a solution of from 1–5% of a copolymer of acrylonitrile and butadiene in coal tar emulsified in an aqueous medium which aqueous medium, prior to the emulsification, contained from 12–45% pigment, the ratio of solution to pigment being within the range of from 0.8:1 to 4.0:1, said cocopolymer being formed of from 49 to 20 parts by weight of acrylonitrile and 51 to 80 parts by weight of butadiene.

4. A process for forming an emulsion consisting essentially of the steps of forming a solution of from 1 to 5% of a copolymer of acrylonitrile and butadiene in coal tar, said copolymer being comprised of from 49 to 20 parts by weight of acrylonitrile and 51 to 80 parts by weight of butadiene, forming an aqueous slurry containing from 12–45% by weight of pigment, blending said solution and said slurry to provide a ratio of solution to pigment ranging from 0.8:1 to 4.0:1, and passing said blend through a colloid mill to form an emulsion.

5. A protective coating composition consisting essentially of an aqueous emulsion containing a solution of from 1 to 5% by weight of a copolymer of acrylonitrile and butadiene in tar and pigment, said copolymer being formed of from 49 to 20 parts by weight of acrylonitrile and 51 to 80 parts by weight of butadiene, the weight ratio of said tar solution to said pigment being within the range of 1.8:1 to 3.0:1, said tar solution and pigment being the discontinuous phase of said emulsion.

6. An adhesive composition consisting essentially of an aqueous emulsion containing a solution of from 1 to 5% of a copolymer of acrylonitrile and butadiene in tar and pigment, and said copolymer being formed of from 49 to 20 parts by weight of acrylonitrile and 51 to 80 parts by weight of butadiene, the weight ratio of said tar solution to said pigment being within the range of 2.5:1 to 4:1, and said tar solution and pigment being the discontinuous phase of said emulsion.

7. A process for forming an emulsion consisting essentially of the steps of dissolving 1 to 5% by weight of a copolymer of acrylonitrile and butadiene in coal tar, said copolymer being formed of a minor proportion of acrylonitrile and a major proportion of butadiene, forming an aqueous slurry containing by weight from 12 to 45% of the pigment, blending said solution and said slurry, to provide a ratio of said solution to said pigment within the range of from 0.8:1 to 4.0:1, and subjecting said blend to intense shearing to form an emulsion and controlling the consistency of said emulsion by controlling the ratio of solution to slurry in said blending.

References Cited in the file of this patent

UNITED STATES PATENTS

| 2,509,777 | McMillan et al. | May 30, 1950 |
| 2,537,190 | Lankau et al. | Jan. 9, 1951 |
| 2,807,596 | Flickinger | Sept. 24, 1957 |